United States Patent
Panchal et al.

(10) Patent No.: US 9,369,964 B2
(45) Date of Patent: Jun. 14, 2016

(54) MOBILE DEVICE RADIO POWER CONSUMPTION AND BATTERY CAPACITY MANAGEMENT

(71) Applicants: Verizon Patent and Licensing Inc., Arlington, VA (US); Cellco Partnership, Arlington, VA (US)

(72) Inventors: Jignesh Shantilal Panchal, Somerset, NJ (US); Raafat Edward Kamel, Little Falls, NJ (US); Lalit R. Kotecha, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 107 days.

(21) Appl. No.: 13/971,792

(22) Filed: Aug. 20, 2013

(65) Prior Publication Data

US 2015/0056947 A1 Feb. 26, 2015

(51) Int. Cl.
*H04B 1/00* (2006.01)
*H04W 52/02* (2009.01)
*H04W 52/36* (2009.01)
*H04W 52/26* (2009.01)

(52) U.S. Cl.
CPC ........ *H04W 52/0251* (2013.01); *H04W 52/267* (2013.01); *H04W 52/365* (2013.01)

(58) Field of Classification Search
CPC ............ H04W 52/365; H04W 52/146; H04W 52/367; H04W 52/267; H04W 52/34; H04W 72/1268; H04W 52/325; H04W 52/04; H04W 72/04; H04W 52/242; H04W 24/10; H04W 72/0413; H04W 88/02; H04W 24/00; H04W 28/06; H04W 52/0216; H04W 52/0229; H04W 52/0235; H04W 52/0261; H04W 52/243; H04W 52/02; Y02B 60/50; Y02B 60/1217; Y02B 60/1282; H04L 5/001; H04L 1/0003; H04L 1/0007; H04L 1/0009; H04L 1/0015; H04L 1/1822; H04L 1/1887; H04L 27/261

See application file for complete search history.

(56) References Cited

U.S. PATENT DOCUMENTS

| | | | |
|---|---|---|---|
| 2010/0178900 A1* | 7/2010 | Cheng et al. | 455/414.1 |
| 2012/0184221 A1* | 7/2012 | Jung et al. | 455/67.11 |
| 2012/0207112 A1* | 8/2012 | Kim et al. | 370/329 |
| 2013/0128856 A1* | 5/2013 | Iwai | H04L 5/001 370/329 |
| 2014/0045543 A1* | 2/2014 | Ishii et al. | 455/522 |
| 2014/0323141 A1* | 10/2014 | Boos | H04B 7/02 455/452.1 |

OTHER PUBLICATIONS

LTE Quick Reference: PHR(Power Headroom Report); Printed Aug. 20, 2013, from the web page:http://www.sharetechnote.com/html/Handbook_LTE_PHR.html; author unknown.

* cited by examiner

*Primary Examiner* — Golam Sorowar (57) ABSTRACT

A mobile device may manage the battery of the mobile device by controlling radio power usage. In one implementation, a mobile device may determine a target power usage associated with a radio of the mobile device, the radio implementing a radio link with a base station associated with a cellular wireless network. The mobile device may also determine an actual power usage associated with the radio of the mobile device and compare the actual power usage to the target power usage. The mobile device may communicate with the base station, and based on the comparison of the actual power usage to the target power usage, to cause the base station to reduce a bit rate associated with the radio link.

20 Claims, 9 Drawing Sheets

MOBILE DEVICE RADIO POWER CONSUMPTION AND BATTERY CAPACITY MANAGEMENT

BACKGROUND

In an increasingly networked world, more and more traffic, such as data, voice, and video, is transmitted over public and proprietary networks. Wireless networks, in particular, are popular as networks through which subscribers obtain both voice services (e.g., telephone calls) and data services (e.g., email and web surfing).

Mobile devices, such as smart phones, that use wireless networks, can be limited by the battery life of the mobile device. Depending on how the mobile device is used, the time period before the mobile device needs to be recharged can be a day or less. Car charging and office charging of mobile devices are common.

DETAILED DESCRIPTION OF PREFERRED EMBODIMENTS

The following detailed description refers to the accompanying drawings. The same reference numbers in different drawings may identify the same or similar elements.

Techniques described herein may relate to battery management for a mobile device. A mobile device may maintain power profiles that define how the mobile device is to behave based on a battery level of the mobile device. For example, when the mobile device is fully or nearly fully charged, a "high performance" profile may be active, which may indicate that the mobile device may operate to emphasize performance over battery conservation. The power profiles may particularly relate to the radio transmit and/or receive power that is used by the mobile device in communicating with a wireless network provider (e.g., a cellular network provider). For instance, based on the active power profile, a mobile device may act to reduce the power used when transmitting data to a base station associated with the wireless network provider.

Figure 1A:
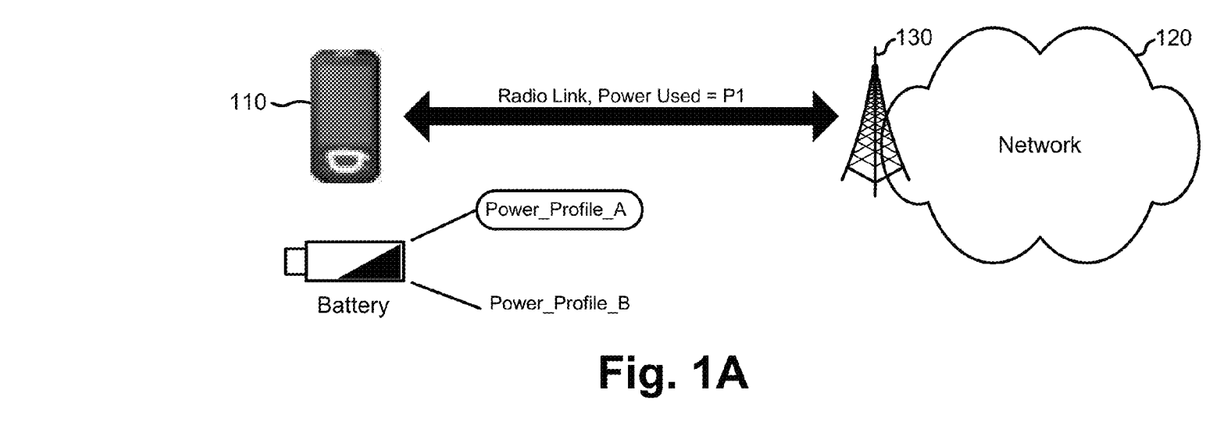
FIGS. 1A and 1B are diagrams conceptually illustrating an example of an overview of concepts described herein.
Figure 1B:
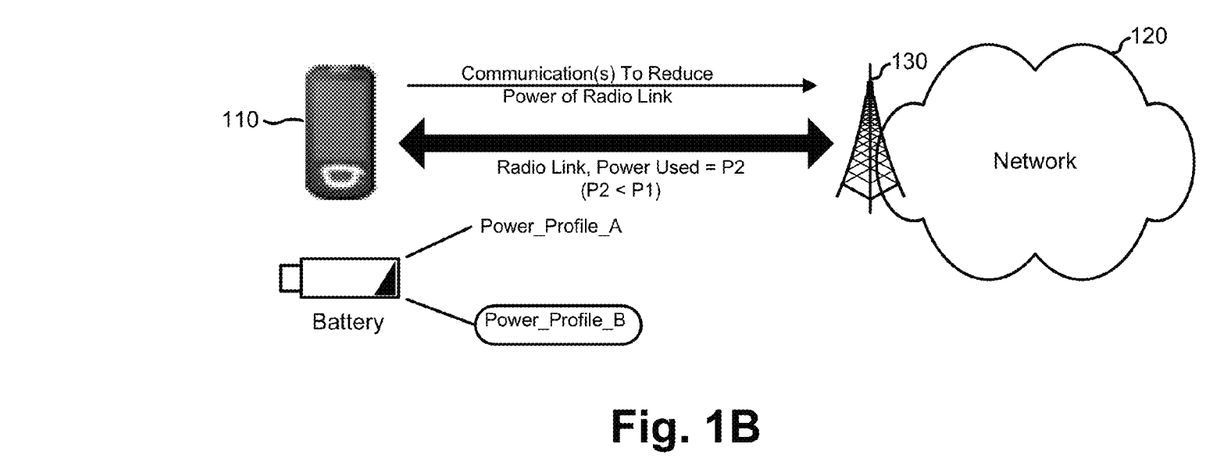

FIGS. 1A and 1B are diagrams conceptually illustrating an example of an overview of concepts described herein. As shown in FIGS. 1A and 1B, a mobile device 110 may connect to network 120, such as a wireless network (e.g., a cellular wireless network), via a radio link. Mobile device 110 may particularly communicate with base stations 130 that are associated with network 120. The radio link may be used, for example, to provide voice and/or data communications for mobile device 110. Mobile device 110 may include a battery that provides power to the mobile device, such as power needed to implement the radio link.

As shown in FIG. 1A, mobile device 110 may be associated with a number of power profiles, labeled as "Power_Profile_A" and "Power_Profile_B." In the context of FIG. 1A, the power profile "Power_Profile_A" may be the active profile. This profile may be used when the battery has a moderate amount of energy remaining. The profile may particularly include one or more parameters defining a desirable or target level of power to use for the radio link (e.g., the power used may be limited to a value P1). For example, the profile may include a particular maximum power level that should be used for the uplink radio channel (the communication link over which mobile device 110 transmits data to network 120).

At some point, assume that the remaining energy of the battery declines below a lower threshold level. As illustrated in FIG. 1B, at this time, mobile device 110 may begin to use "Power_Profile_B." This power profile may correspond to a low battery energy mode in which mobile device 110 should conserve power. For this power profile, the maximum power level that should be used for the uplink radio channel may be lower than the maximum power level they may be used in "Power_Profile_A" (e.g., the power used may be limited to a value P2, where P2<P1). In this manner the mobile device 110 may respond to a change in the battery energy level by behaving in a way, with respect to the radio link, that reduces power consumption of mobile device 110. The battery life of mobile device 110 may thus be extended.

In some wireless networks, a mobile device, such as mobile device 110, may transmit a Power Headroom Report (PHR), that indicates how much transmission power is available for the mobile device to use in addition to the transmission power currently being used by the mobile device. The base station may use the PHR, for a particular mobile device, to modify the bit rate being transmitted by the mobile device. For example, if the PHR, received from a mobile device, indicates that the mobile device has little additional power to use for transmission, and the bit error rate (BER) of the data received from the mobile device is above (or higher) than a threshold level, the base station may instruct the mobile device to transmit at a lower bit rate. The lower bit rate may effectively permit additional power to be used for each transmitted bit, thus decreasing the BER by increasing power per bit. In one implementation, as described in more detail below, mobile device 110 may manipulate the reported PHR to cause the base station to lower the transmission rate associated with the mobile device, which may correspondingly result in the mobile device reducing power consumption of the transmission link (e.g., to meet the desired power threshold indicated by the active power profile).

In other implementations described herein, a mobile device may use other techniques to reduce power for a radio link. For example, the functionality of the base station may be configured to allow for explicit requests, from mobile devices, to lower the radio power being used by the mobile devices.

Figure 2:
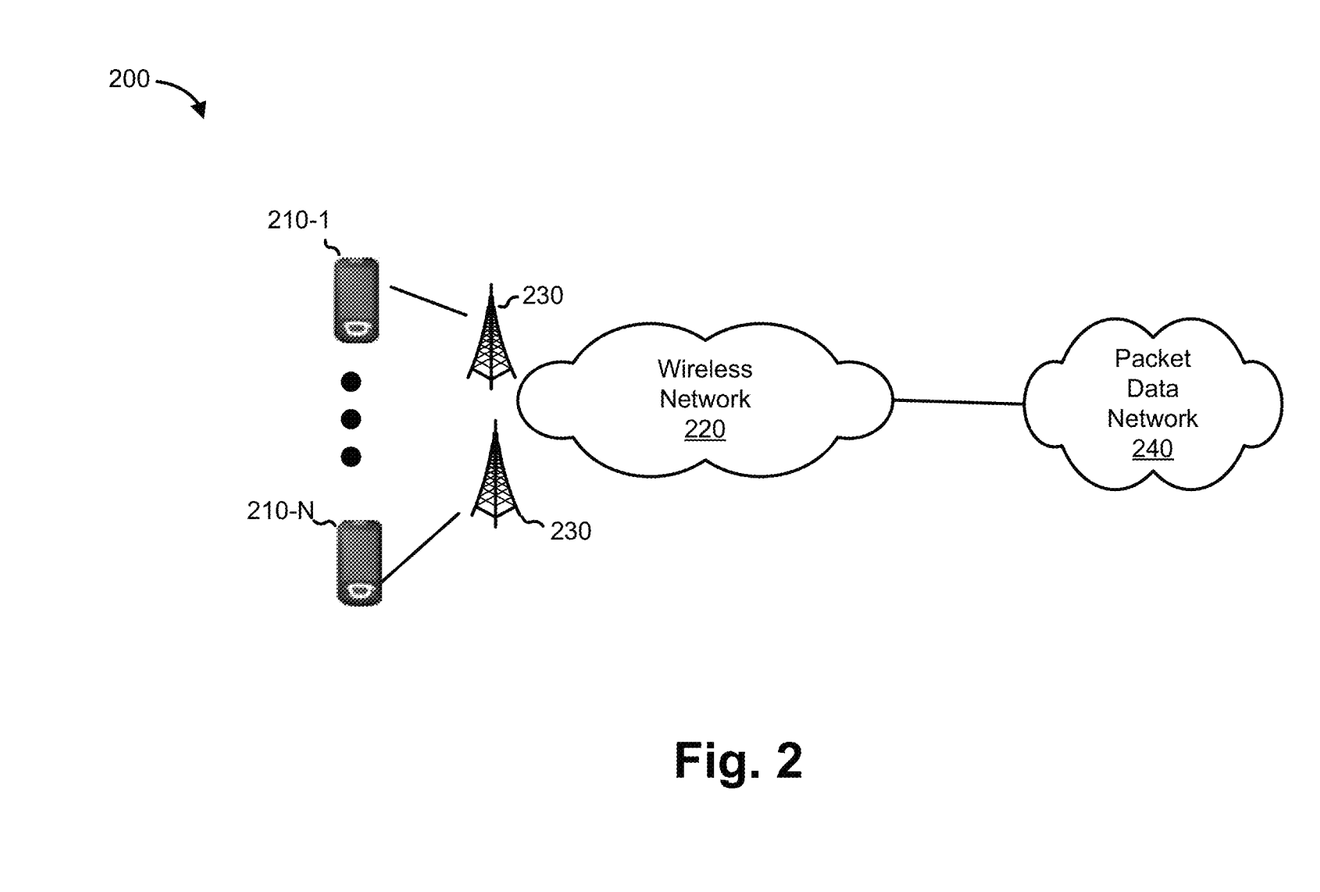
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more mobile devices 210-1 through 210-N (referred to collectively as "mobile devices 210" or singularly as "mobile device 210"). Mobile devices 210 may obtain network connectivity through wireless network 220 (e.g., a cellular network). Wireless network 220 may additionally connect to one or more external networks, illustrated as packet data network 240.

Mobile devices 210 may include portable computing and communication devices, such as a personal digital assistant (PDA), a smart phone, a cellular phone, a laptop computer with connectivity to a cellular wireless network, a tablet computer, etc. Mobile devices 210 may also include non-portable computing devices, such as desktop computers, consumer or business appliances, set-top devices (STDs), or other devices that have the ability to connect to wireless network 220. Mobile devices 210 may connect, through a radio link, to wireless network 220. Through the radio link, mobile devices 210 may obtain data and/or voice services, such as content delivery services via which content (e.g., streaming video, streaming audio, or other content) may be delivered to mobile devices 210.

Wireless network 220 may include one or more devices that include radio interfaces to provide wireless connections to mobile devices 210. Wireless network 220 may include, for example, one or more base stations 230. Each base station 230 may provide one or more radio interfaces over which the base station may communicate with mobile devices 210. The radio interfaces may include, for example, orthogonal frequency-division multiplexing (OFDM) and/or single-carrier frequency-division multiple access (SC-FDMA) based radio interfaces. In the context of a network such as a long term evolution (LTE) network, base stations 230 may be referred to as evolved Node Bs (eNodeBs).

Packet data network 240 may include one or more packet networks, such as an Internet Protocol (IP) based packet network. Packet data network 240 may include a wide area network (WAN), a local area network (LAN), and/or combinations of WANs and LANs. Mobile devices 210 may access packet data network 240 to obtain computation and/or data services.

In one implementation, wireless network 220 may be a Long Term Evolution (LTE) network. In the context of an LTE network, base stations 230 may take the form of eNodeBs ("eNBs"). In other possible implementations, the functionality corresponding to FIG. 2 may be implemented based on other standards or technologies.

Figure 3:
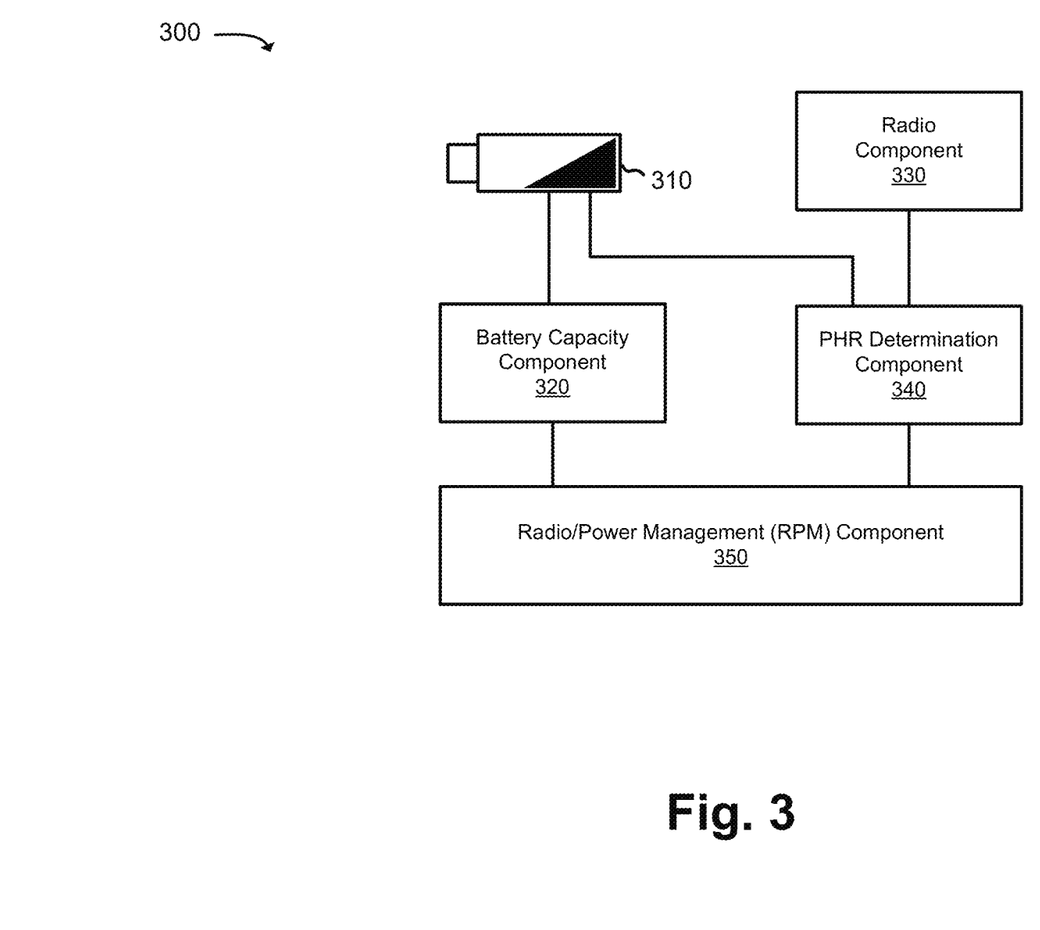
FIG. 3 is a diagram illustrating an example of components that may be included within a mobile device.

FIG. 3 is a diagram illustrating an example of components 300 that may be included within a mobile device 210. Components 300 may include battery 310, battery capacity component 320, radio component 330, PHR determination component 340, and radio/power management (RPM) component 350.

Battery 310 may include electrochemical cells that provide electrical energy to mobile device 210. Battery 310 may be rechargeable. Battery 310 may be associated with a particular total capacity, which may refer to the total energy level that is stored in and capable of being delivered by battery 310, when battery 310 is fully charged. The battery capacity or current energy level may be measured, for example, as the ability to deliver an amount of current for a time period (e.g., in units of amp-hours). As battery 310 is used by mobile device 310, the stored energy level of the battery may decrease.

Battery capacity component 320 may include logic (e.g., circuitry) for measuring and reporting the capacity and/or current energy level of battery 310. In one implementation, the energy level of battery 310 may be reported and measured as a value that will be referred to herein as the battery headroom level (BHL). The BHL may refer to the current energy level of the battery 310 as a percentage of the total capacity of battery 310. For example, a BHL of 80% may indicate that 20% of the capacity of battery 310 has been used. Alternatively or additionally, battery capacity component 320 may generate or output other metrics relating to the energy level of battery 310. For example, battery capacity component 320 may additionally convert the remaining energy level of battery 310 into a time value indicating an estimated amount of time that battery 310 will continue to be able to supply power to mobile device 210. For the determination of the time value, battery capacity component 320 may additionally take into account the current power usage of mobile device 310.

Radio component 330 may include circuitry, logic, or other elements relating to the physical implementation of the radio connectivity (e.g., radio links to base stations 230) that is established by mobile device 210. Radio component 330 may include, for example, one or more antennas, amplifiers, and/or other radio frequency elements. Radio component 330 may be responsible for the physical transmission and reception of the radio waves that are used to implement the wireless connectivity for mobile device 210.

As mentioned, the Power Headroom Report (PHR) may be a communication that is used in certain wireless networks, such as LTE networks, in which mobile devices 210 indicate how much transmission power is available for the mobile device to use in addition to the transmission power currently being used by the mobile device. For a typical mobile device, more power may be used to transmit data than to receive data. Further, the power used to transmit data may vary as the mobile device moves around a wireless cell (e.g., a mobile device that is further from a particular base station 230 may require more power to transmit data than a mobile device that is closer to the particular base station 230).

Base stations 230 may control communication parameters, associated with a wireless link, based on the PHR received from a mobile device 210. For example, base station 230 may be configured to control radio links such that the bit error rate (BER) for the radio link is less than a threshold value (e.g., 1%). When the BER falls below the threshold, the power used by the mobile device, in transmitting the data, may be increased or the base station may decrease the bit transmission rate (which may correspondingly cause more power to be devoted to each transmitted bit). In situations in which the PHR, received from a mobile device, indicates that the mobile device has no additional power available for transmissions, the base station may affect the BER by modifying the bit transmission rate (e.g., lowering the bit transmission rate to decrease the BER by allowing more power to be used per bit).

PHR determination component 340 may monitor and/or otherwise interact with radio component 330 and/or battery 310 to measure the PHR. For example, PHR determination component 340 may determine the current power consumption, corresponding to transmission and/or reception elements of radio component 330. PHR determination component 340 may provide the measured PHR to RPM component 350 and/or directly transmit the PHR to base stations 230. In some situations, a wireless network may stipulate that the uplink transmission power of a mobile device stays within a maximum limit (e.g., 23 dBm for a class three LTE mobile device). Base stations 230 may use the PHR to ensure that the power corresponding to the mobile device radio uplink stays within this maximum limit.

RPM component 350 may include logic to manage the power consumption of mobile device 210. RPM component 350 may receive the BHL from battery capacity component 320 and/or the PHR from the PHR determination component 340. RPM component 350 may use this information to, for example, select an active power profile for mobile device 210 and, based on the selected profile, control the power consumption of mobile device 210. The operation of RPM component 350, and of other ones of components 300, in managing the power consumption of mobile device 210, will be described in more detail below.

Figure 4:
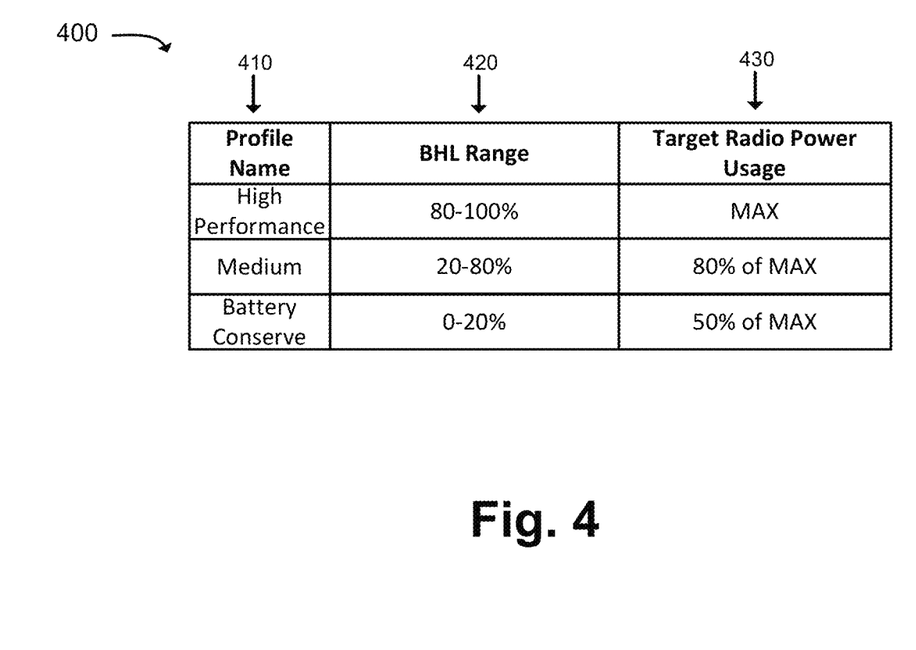
FIG. 4 is a diagram illustrating an example data structure that may be maintained by a mobile device.

FIG. 4 is a diagram illustrating an example data structure 400 that may be maintained by mobile device 210. Data structure 400 may generally store information relating to power profiles that may be used by mobile device 210.

As illustrated, data structure 400 may include a number of fields, including: profile name field 410, BHL range field 420, and target radio power usage field 430. Each record in data structure 400, corresponding to one set of fields 410-430, may represent a power profile for mobile device 210. In alternative possible implementations, different, fewer, or additional fields may be implemented.

Profile name field 410 may identify the power profiles used by mobile device 210. In some implementations, power profiles may be customizable and/or creatable by the users of mobile devices 210. Alternatively or additionally, power profiles may be defined by a manufacturer and/or a network service provider associated with mobile devices 210. Three example power profiles are illustrated in FIG. 4: "high performance," "medium," and "battery conserve." BHL range field 420 may identify the BHL range associated with each power profile. As shown, high performance power profile may be used when battery 310 is at a relatively high energy level (e.g., BHL range between 80% and 100%), the medium power profile may be used when battery 310 is at medium energy level (e.g., BHL range between 20% and 80%), and the battery conserve power profile may be used when battery 310 is a at a relatively low energy level (e.g., BHL range between 0% and 20%).

Target power usage field 430 may define, for each power profile, a target radio power usage range (or, alternatively, value). In one implementation, the target radio power range may be for radio links, established by radio component 330, in the transmit (uplink) direction from mobile device 210 to base station 230. Alternatively or additionally, the target radio power range may also include values relating to the total power used by radio component 330 (e.g., in the uplink and downlink direction) and/or in the downlink direction. In the example illustrated, for the high-performance profile, the target radio power usage may be set to MAX, which may indicate that mobile device 210 may use normal transmit power levels. For example, for a class three LTE mobile device, the maximum uplink transmission power of mobile device may be 23 dBm. The mobile device may use less power depending on factors such as the range of the mobile device from a base station 230. The actual power used by the mobile device may be determined based on operation of base station 230. For the medium power profile, the target power usage may be set to 80% of MAX, which may indicate that, when the medium power profile is active, and the transmit power is above 80% of the maximum value (e.g., 23 dBm), mobile device 210 may take actions (described in more detail below) to reduce the transmit power. Similarly, for the battery conserve power profile, a target power usage may be set to 50% of MAX, which may indicate that, when the battery conserve power profile is active, and the transmit power is above 50% of the maximum value, mobile device 210 may take actions to reduce the transmit power.

Figure 5:
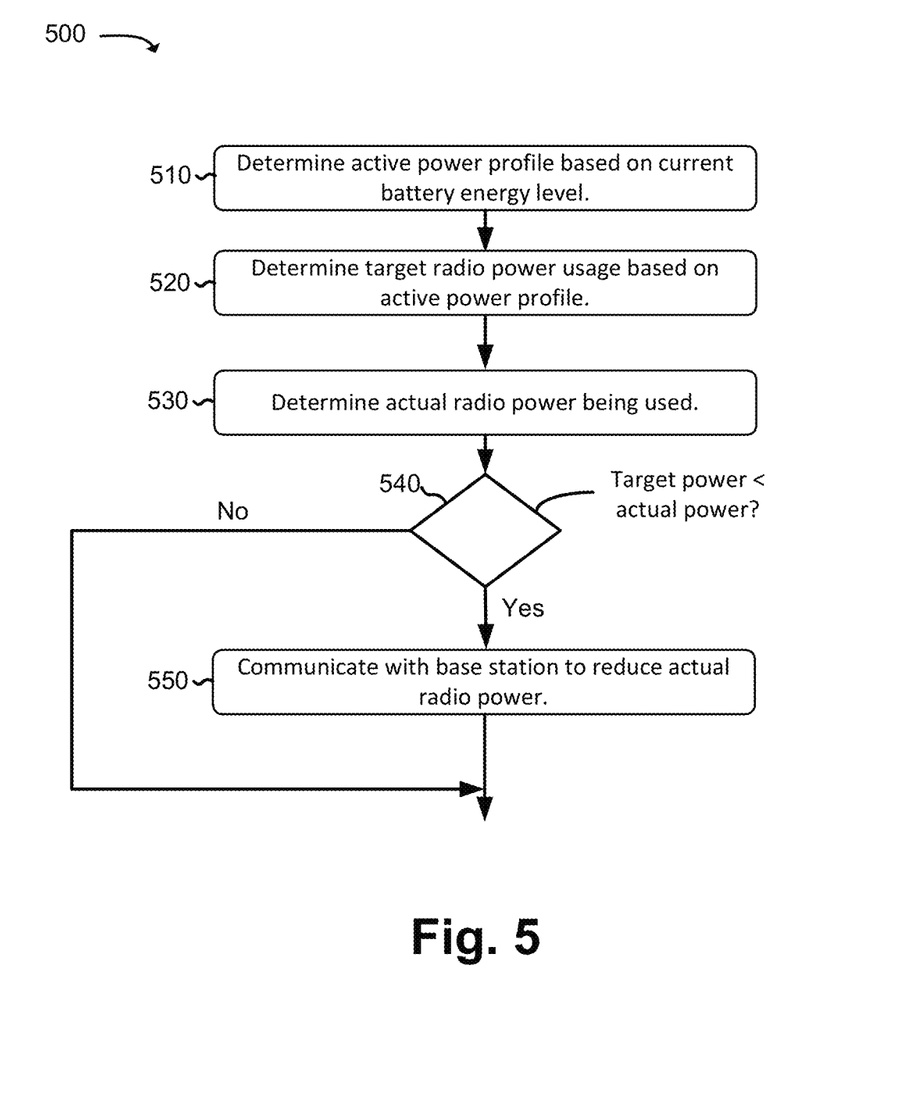
FIG. 5 is a flowchart illustrating an example process for managing power consumption in a mobile device.

FIG. 5 is a flowchart illustrating an example process 500 for managing power consumption in a mobile device. In one implementation, process 500 may be implemented by mobile device 210 or by a combination of mobile device 210 and a base station 230. In some implementations, process 500 may be implemented by mobile device 210 when the current battery energy level of mobile device 210 falls below a predetermined level. In other implementations, process 500 may be implemented for all battery energy levels of mobile device 210.

Process 500 may include determining the active power profile based on the current battery capacity (block 510). As previously mentioned, battery capacity component 320 may measure the BHL value, for battery 310, of mobile device 210. The BHL value, may, for example, represent the remaining energy level of battery 310 (e.g., expressed as a percentage). The active power profile may be determined based on the current BHL value, such as by a comparison of the BHL value to BHL range field 420 of data structure 400.

Process 500 may further include determining, based on the active power profile, the target radio power (block 520). As illustrated in data structure 400, each power profile may be associated with a target radio power (e.g., target radio power usage field 430). The target radio power may specify, for example, the maximum target power level that radio component 330 may use for uplink transmissions. Alternatively or additionally, the maximum target power level may include values for downlink transmissions or for both uplink and downlink transmissions.

In alternative possible implementations, instead of directly determining the target radio power based on a query to a data structure (e.g., data structure 400), mobile device 210 may determine the target radio power based on other techniques. For example, the active power profile may specify an amount of time that mobile device should continue to be able to operate or another parameter that relates to power usage of mobile device 210. Based on the amount of time or the other parameter, and potentially based on other factors, such as the current remaining energy level of battery 310 and/or a current power usage of mobile device 210, mobile device 210 may calculate the target radio power.

Process 500 may further include determining the actual radio power being used (block 530). The radio power being used may correspond to the electrical power being used to transmit data (uplink power) and/or to the electrical power being used to transmit and receive data (uplink and downlink power). In a typical scenario, mobile device 210 may use more power in the uplink direction than the downlink direction. The amount of power being used, at any particular time, may depend on a number of factors, such as the distance of the mobile device 210 to the corresponding base station 230 and on the transmission rate (e.g., bits per unit of time) specified by the base station.

Process 500 may further include determining whether the target radio power is less than the actual radio power by comparing the target radio power to the actual radio power (block 540). When the target radio power is less than the actual radio power (block 540—Yes), mobile device 210 may attempt to reduce the actual power being used by radio component 330. In particular, in this situation, process 500 may further include communicating with the corresponding base station to reduce the actual radio power (block 550). In one implementation, communicating with the corresponding base station may include modifying a measured PHR to obtain a "diluted" PHR, and transmitting the diluted PHR to the base station. A value of the diluted PHR may be determined based on the expectation that the base station will reduce the transmitted bit rate (e.g., by allocating less bandwidth to the mobile device) and thus cause a reduction in the used radio power. In another possible implementation, communicating with the corresponding base station may include directly indicating to the base station that mobile device 210 requests a reduction in the power needed to communicate with the base station. Both of these implementations will be described in more detail below.

Figure 6:
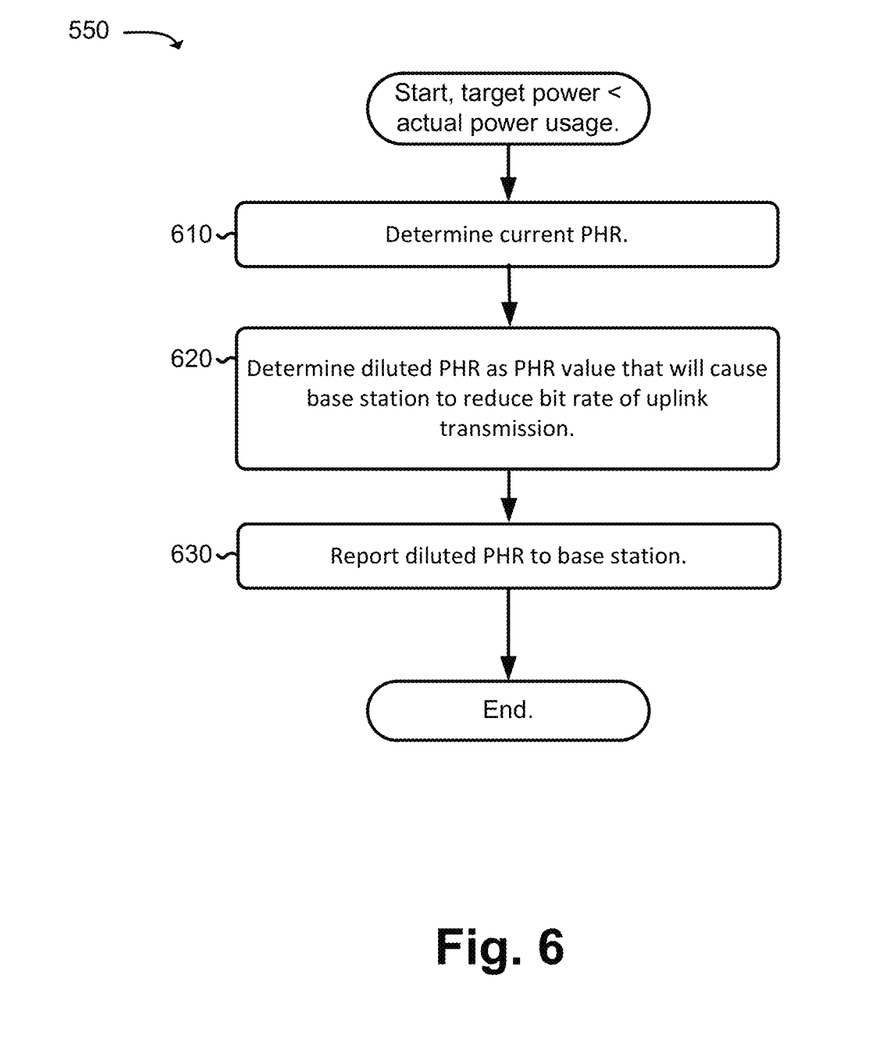
FIG. 6 is a flowchart illustrating an example process for implementing a portion of the process shown in FIG. 5.

FIG. 6 is a flowchart illustrating an example process for implementing block 550 of process 500 (FIG. 5). As illustrated, a current value of PHR may be determined (block 610). As previously mentioned, the PHR may indicate how much transmission power is available for the mobile device to use in addition to the transmission power currently being used by the mobile device. In an LTE system, PHR may be reported by mobile devices to base stations. The base stations may use the PHR values to control the radio links established with the mobile devices. For instance, the base stations may use the PHR values when determining the uplink bit rates that can be supported in the radio links. In one implementation, PHR determination component 340 may determine the current PHR value and provide the PHR value to RPM component 350.

Block 550, as shown in the implementation FIG. 6, may further include determining the diluted PHR, where the diluted PHR may be determined as a value that will cause the base station to reduce a bit rate of the uplink (e.g., from the mobile device to the base station) transmission (block 620). As an example, in the LTE standard, a PHR value (in linear scale, because in dB scale it may be a negative value) less than 1.0 may normally indicate that mobile device 210 is using too much power and needs to limit its power usage (e.g., a PHR value of less than 1.0 may normally indicate that the uplink power consumption is greater than the 23 dBm (i.e., 200 mW) maximum). Base station 230 may respond by reducing the uplink bit rate for mobile device 210. The diluted PHR may be determined as a value lower than the actual PHR.

The reduction in the uplink bit rate may correspond to base station 230 assigning a fewer number of time frequency resources (e.g., physical resource blocks) and thus limiting the transport block size (TBS) for uplink transmission (TX). Here, TBS may be a physical layer payload size representing an instantaneous data rate.

The diluted PHR, as determined in block 620, may be reported to the base station (block 630). The diluted PHR may be reported as part of normal operation of mobile device 210. Because the diluted PHR is set to a value that will cause the base station to reduce the uplink bit rate, reception of the PHR by the base station should eventually cause a reduction in the power used by radio component 330 for the uplink transmission.

In the implementation shown in FIG. 6, a mobile device 210 may indirectly control uplink power usage by manipulating a parameter (i.e., PHR) reported to base station 230. Advantageously, mobile device 210 may exert control over its uplink power usage without requiring modification to the logic of base station 320.

Figure 7:
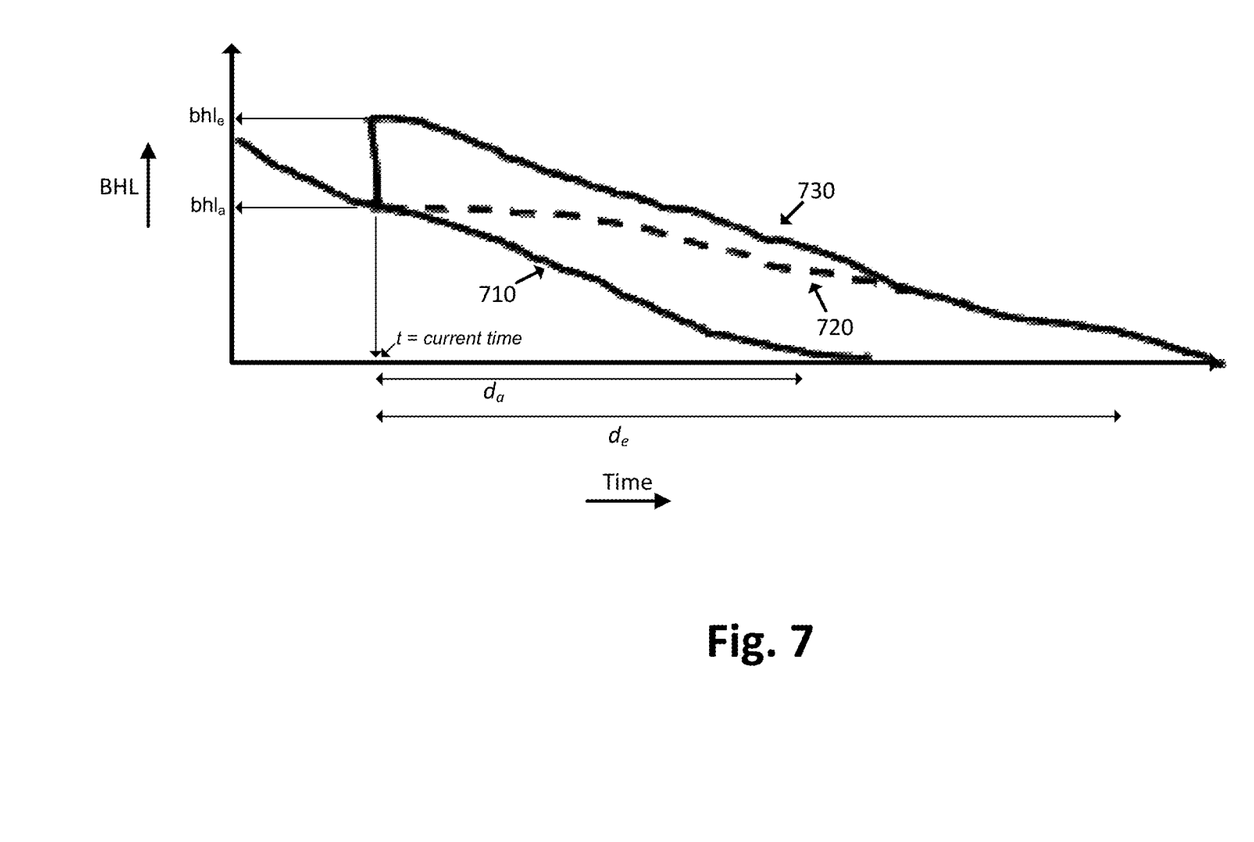
FIG. 7 is a diagram illustrating an example of a chart of battery capacity that may be used in determining a diluted power headroom report value.

FIG. 7 is a diagram illustrating an example of a chart of battery energy level that may be used in determining the diluted PHR. A plot of BHL versus time is particularly illustrated in the chart of FIG. 7. Curve 710 in FIG. 7 may represent a trend of battery consumption based on a current uplink data rate. It may be desirable to prolong the battery life of mobile device 210 to the trend represented by curve 720. Curve 730 may represent a theoretical battery life usage curve that may be used in the calculation of the diluted PHR (described below).

As shown in FIG. 7, the time plot of curve 710 predicts that battery 310 will last for the time period $d_a$. To increase the battery life from $d_a$ to $d_e$, the rate of reduction of BHL should be decreased from that of curve 710 to that of curve 720/730. It may be assumed that the magnitude of the slope of curve 710 (rate of change of BHL) is inversely proportional to the current transmit power consumption level, $P_a$, and similarly, the target rate of change of BHL (curve 720) is inversely proportional to the target transmit power consumption, $P_e$. Accordingly, in one implementation, $P_e$ may be obtained as $(bhl_a/bhl_e) \times P_a$, where $bhl_a$ and $bhl_e$ refer to battery headroom levels of curve 710 and 730 at the current time t, respectively, as shown in FIG. 7.

The target number of bits to transmit ($b_e$), per uplink transmission, may be expressed as $P_e/p$, where p is the transmit power per bit required to achieve a given BER and $P_e$ is the total power required to transmit the payload size $b_e$ (in bits). The payload in bits ($b_e$) is also referred to as transmit block size (TBS). The value of $b_e$ may additionally be subject to the constraint that it is greater than a configured minimum uplink data rate ($b_{min}$). To apply this constraint, $P_e$ may be determined as $\max(b_e p, b_{min} p)$. The ratio of $P_e/P_a$ may then be used to determine the diluted PHR. For example, in the linear domain, the diluted maximum transmit power may be calculated as $(P_e/P_a) \times 200$ mW. Thus, diluted PHR, as reported by mobile device 210, may be calculated as $((P_e/P_a) \times 200 \text{ mW}) \times (b_a \times p)$, where $b_a$ is the payload size in bits at the current time t. The diluted PHR may be reported to base station 230 in the normal course of operation of mobile device 210.

Figure 8:
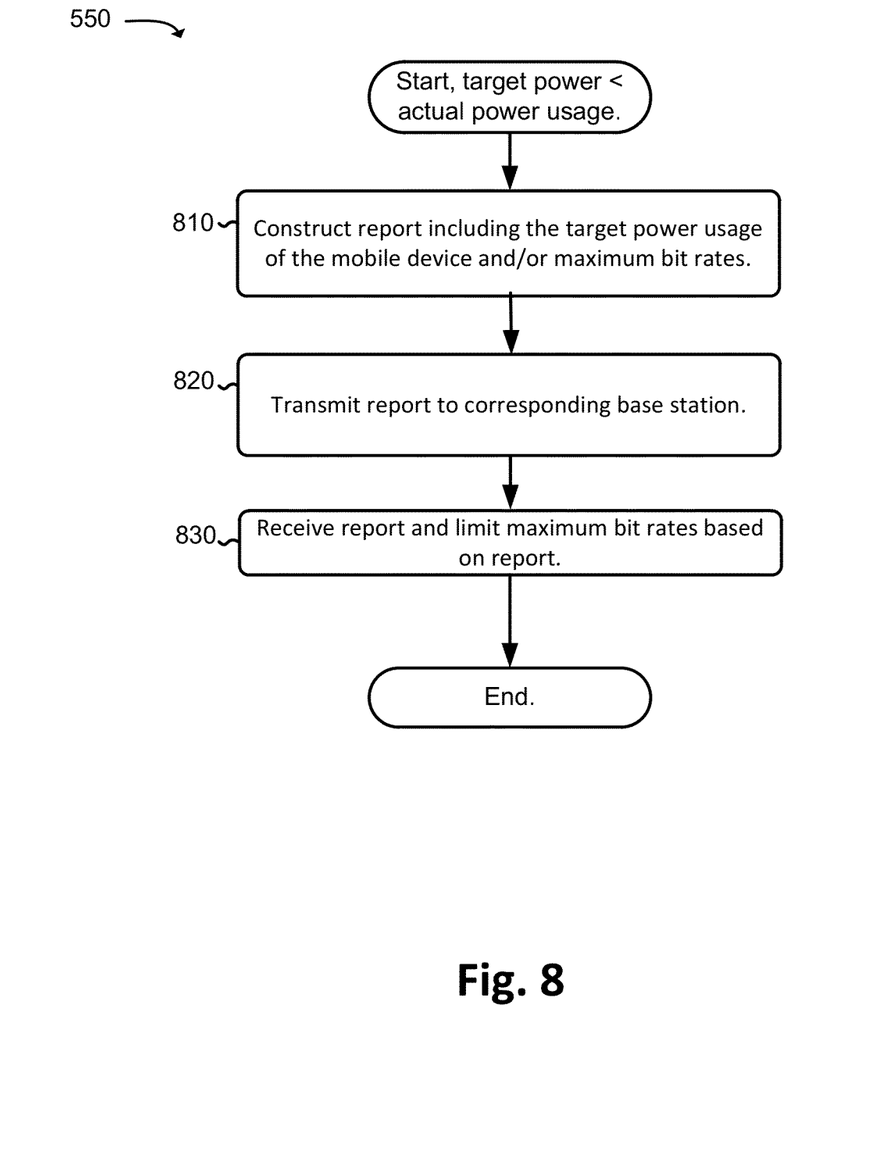
FIG. 8 is another flowchart illustrating an example process for implementing a portion of the process shown in FIG. 5.

FIG. 8 is a flowchart illustrating a second example process for implementing block 550 of process 500 (FIG. 5). In the implementation of FIG. 8, mobile device 210 may directly request, to base station 230, a reduction in the power needed to communicate with the base station. In some implementations, the process shown in FIG. 8 may be implemented by mobile device 210 and/or base station 230.

As illustrated, mobile device 210 may construct a report (e.g., a message) that includes information regarding the target radio power usage of the mobile device and/or target maximum bit rates for the mobile device (block 810). In one implementation, the report may include desired uplink and/or downlink power usage levels of mobile device 210. Alternatively or additionally, the report may include desired uplink and/or downlink bit rate values (or other values indicating a desired uplink/downlink bandwidth). In one implementation, the report may contain quantized values indicating upper limits on the uplink and downlink physical layer bit rate.

The process shown in FIG. 8 may further include transmitting the report to a base station (block 820). In one implementation, the report may be transmitted as part of the 3GPP/LTE MAC layer control information.

The transmitted report may be received by a base station 230 associated with mobile device 210. Base station 230 may limit the maximum bit rates, for the mobile device, based on the report (block 830). In one implementation, base station 230 may limit the maximum bit rates on user data flows for uplink transmissions and downlink receptions by limiting the corresponding uplink and downlink physical layer payload bits for each transmission and reception time-slot grant. For example, base station 230 may reduce an average physical layer data rate for the mobile device by modifying uplink and/or downlink schedulers that are allocated to the mobile device. In response to the operation of base station 230, mobile device 210 may reduce actual bit rates for transmissions and receptions. The actual bit rates may be determined, for example, as a maximum of: (1) the values received from base station 230, and (2) a minimum threshold value that is defined for the wireless network.

As described above, a mobile device may reduce power consumption relating to radio transmission and/or reception by communicating the desire to reduce power, either directly or indirectly, with a base station. In this manner, the battery life of the mobile device may be increased.

In alternative or additional possible implementations, mobile device 210 may increase the battery life using other techniques. For example, mobile device 210 may use the BHL values to reduce unnecessary initiation of non-time-critical transmission activities by certain applications. The list of non-time-critical activities or applications may be set by a user of mobile device, a service provider associated with mobile device, or set during manufacture of mobile device. As another example, the device may inform application servers to halt (e.g. a cache now and delivery later process) unnecessary non-time-critical exchanges of information, which may also increase the battery life of the mobile device.

The battery life management techniques described herein may, in some implementations, be particularly applied for Machine to Machine (M2M) systems. Nodes in an M2M system may include battery powered devices that transmit sensed data, via wireless communications, to an application server or other analysis point for the M2M system. The battery powered nodes may be recharged infrequently or intermittently (e.g., via solar power). The nodes may use the techniques described herein to manage the battery life of the node.

Figure 9:
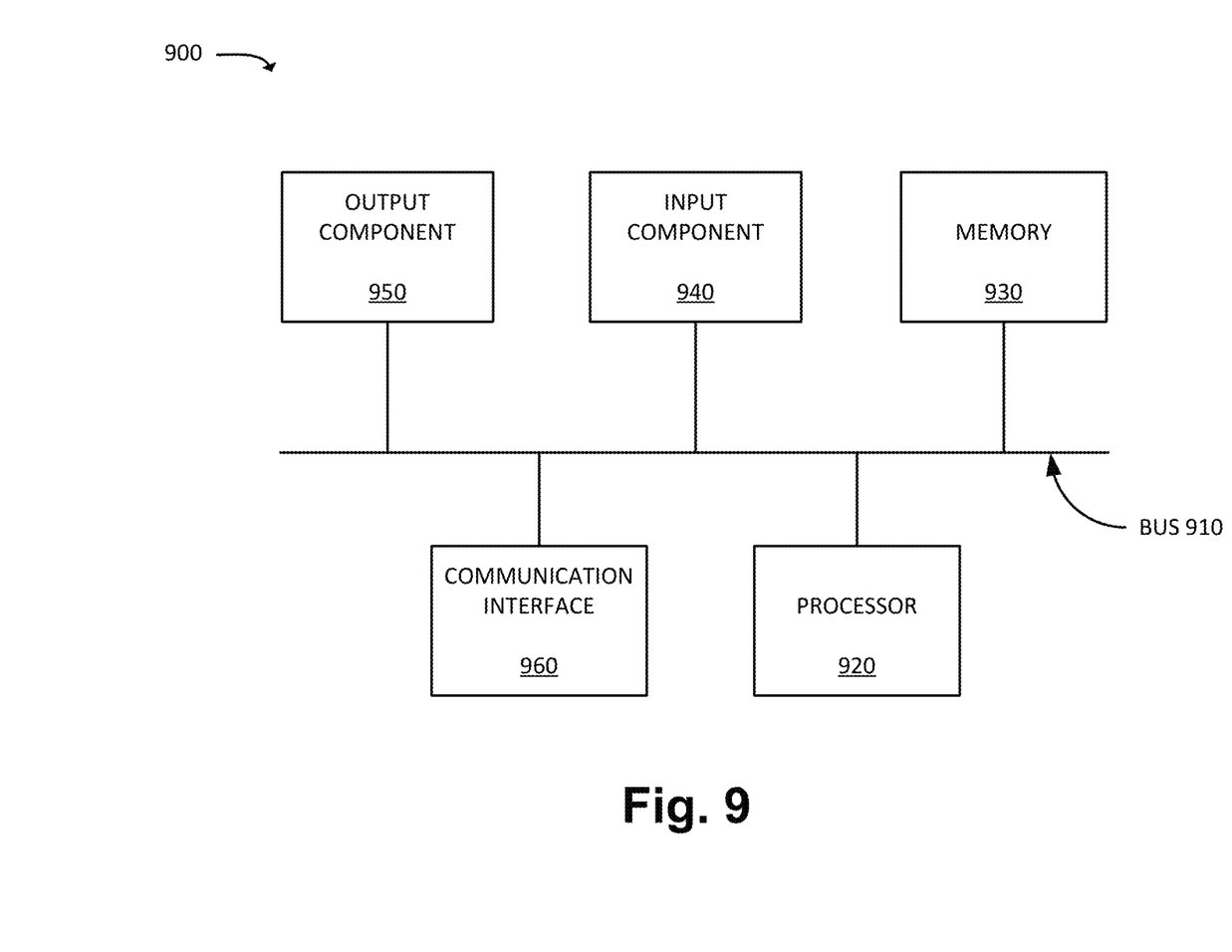
FIG. 9 is a diagram of example components of a device.

FIG. 9 is a diagram of example components of device 900. One or more of the devices described above (e.g., with respect to FIGS. 1A, 1B, 2, and/or 3) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5, 6, and 8, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2 and 3), in practice, additional, fewer, or different, connections or devices may be used. Furthermore, while various devices and networks are shown separately, in practice, the functionality of multiple devices may be performed by a single device, or the functionality of one device may be performed by multiple devices. Additionally, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A method comprising:
 determining, by a mobile device, a target power usage associated with a radio of the mobile device, the radio implementing a radio link with a base station associated with a cellular wireless network;

determining, by the mobile device, an actual power usage associated with the radio of the mobile device;

determining an actual value for a power headroom report that indicates how much transmission power is available for the mobile device to use in addition to transmission power currently being used by the mobile device;

determining a diluted version of the actual value of the power headroom report based on the actual value for the power headroom report, the target power usage associated with the radio, and the actual power usage associated with the radio, the diluted version of the actual value of the power headroom report being calculated based on:

a ratio of the target power usage to the actual power usage, multiplied by a current payload size and multiplied by a transmit power required to achieve a given bit error rate (BER); and communicating, by the mobile device, with the base station, to transmit the diluted version of the value of the power headroom report to the base station instead of the actual value for the power headroom report, wherein the communication causes the base station to reduce a bit rate associated with the radio link.

2. The method of claim 1, further comprising:
selecting, based on a current energy level of a battery of the mobile device, a power profile from among a plurality of power profiles, each of the plurality of power profiles including information regarding the target power usage.

3. The method of claim 1, wherein reducing the bit rate associated with the radio link causes a reduction in the actual power usage associated with the radio of the mobile device.

4. The method of claim 1, wherein the communicating further includes:
transmitting the target power usage or a target bit rate, corresponding to the reduced bit rate, to the base station.

5. The method of claim 1, further comprising:
determining the target power usage based on a current energy level of a battery of the mobile device.

6. The method of claim 1, wherein the diluted version of the value of the power headroom report is lower than the actual value of the power headroom report.

7. The method of claim 1, wherein the target transmit power is calculated based on a ratio of a current battery headroom level to a target battery headroom level.

8. A mobile device comprising:
a memory; and
at least one processor to execute instructions in the memory to:
determine a target power usage associated with a radio of the mobile device, the radio implementing a radio link with a base station associated with a cellular wireless network;
determine an actual power usage associated with the radio of the mobile device;
determine an actual value for a power headroom report that indicates how much transmission power is available for the mobile device to use in addition to transmission power currently being used by the mobile device;
determining a diluted version of the actual value of the power headroom report based on the actual value for the power headroom report, the target power usage associated with the radio, and the actual power usage associated with the radio, the diluted version of the actual value of the power headroom report being calculated based on:
a ratio of the target power usage to the actual power usage, multiplied by a current payload size and multiplied by a transmit power required to achieve a given bit error rate (BER); and
communicate with the base station, to transmit the diluted version of the value of the power headroom report to the base station instead of the actual value for the power headroom report, to cause the base station to reduce a bit rate associated with the radio link.

9. The mobile device of claim 8, wherein the at least one processor is to further execute instructions in the memory to:
select, based on a current energy level of a battery of the mobile device, a power profile from among a plurality of power profiles, each of the plurality of power profiles including information regarding the target power usage.

10. The mobile device of claim 8, wherein reducing the bit rate associated with the radio link causes a reduction in the actual power usage associated with the radio of the mobile device.

11. The mobile device of claim 8, wherein, when communicating to cause the base station to reduce the bit rate, the at least one processor is to further execute instructions in the memory to:
transmit the target power usage or a target bit rate, corresponding to the reduced bit rate, to the base station.

12. The mobile device of claim 8, wherein the at least one processor is to further execute instructions in the memory to:
determine the target power usage based on a current energy level of a battery of the mobile device.

13. The mobile device of claim 8, wherein the diluted version of the value of the power headroom report is lower than the actual value of the power headroom report.

14. The mobile device of claim 8, wherein the target transmit power is calculated based on a ratio of a current battery headroom level to a target battery headroom level.

15. A system comprising:
a base station in a cellular wireless network; and
a mobile device to communicate, via a radio link, with the base station, the mobile device to:
determine a current energy level of a battery of the mobile device,
determine, based on the current energy level of the battery, a target power usage associated with a transmit power of the radio link, and
determine a diluted value for a power headroom report (PHR), the diluted value being selected as a value that is below an actual value for the PHR to cause the base station to reduce a transmission bit rate that is used by the mobile device to communicate via the radio link, the diluted value for the PHR being calculated based on:
a ratio of the target power usage to an actual power usage of the mobile device, multiplied by a current payload size and multiplied by a transmit power required to achieve a given bit error rate (BER), and
transmit the diluted value for the PHR, instead of the actual value for the PHR, to the base station.

16. The system of claim 15, wherein the mobile device is further to:
compare the actual power usage to the target power usage, wherein the diluted value for the PHR is determined and transmitted to the base station when, based on the comparison, the target power usage is less than the actual power usage.

17. The system of claim 15, wherein the base station is to:
receive the transmitted diluted value for the PHR; and
reduce, based on the received PHR, the bit rate transmitted by the mobile device and to the base station.

18. The system of claim 15, wherein reducing the bit rate transmitted by the mobile device includes configuring one or more schedulers, associated with the base station, to reduce an average physical layer uplink or downlink data rate for the mobile device.

19. The system of claim 15, wherein the mobile device is further to:
 select, based on the current energy level of the battery of the mobile device, a power profile from among a plurality of power profiles, each of the plurality of power profiles including information regarding the target power usage.

20. The system of claim 15, wherein the cellular wireless network includes a wireless network based on a Long Term Evolution (LTE) standard.

* * * * *